United States Patent

[11] 3,628,770

[72] Inventor Thomas E. Rost
 Crystal Lake, Ill.
[21] Appl. No. 34,107
[22] Filed May 4, 1970
[45] Patented Dec. 21, 1971
[73] Assignee Hills-McCanna Company
 Carpentersville, Ill.

[54] DIAPHRAGM VALVE CONSTRUCTION
 4 Claims, 5 Drawing Figs.

[52] U.S. Cl. .................................................... 251/331
[51] Int. Cl. ................................................... F16k 7/16
[50] Field of Search ........................................... 251/331

[56] References Cited
 UNITED STATES PATENTS
 3,250,511 5/1966 Priese ........................... 251/331
 2,855,176 10/1958 Buteler ......................... 251/331 X
 FOREIGN PATENTS
 1,158,335 11/1963 Germany ...................... 251/331
 527,938 10/1940 Great Britain ................ 251/331
 1,002,579 2/1957 Germany ...................... 251/331

Primary Examiner—Arnold Rosenthal
Attorneys—Carl A. Hechmer and Earl T. Reichert ABSTRACT: A diaphragm valve of the general type defined by a valve body having an internal through passage intersected by a weir with a control opening positioned directly above said weir, and a bonnet attached to said body in surrounding relation to said weir with a reciprocal actuator member carried by said bonnet and connected with a flexible diaphragm mounted in overlying relation to said opening. The valve further includes a plate member disposed intermediate said diaphragm and said bonnet, and having a central opening defined by a rigid, outwardly flared edge configuration which provides at least one outwardly facing shoulder. Abutment means cooperable with said shoulder are provided on the actuator, such that upon engagement thereof, inward movement of said actuator precludes overcompression of the diaphragm against the weir. The flared rigid edge configuration permits the diaphragm to flex outwardly to the open condition and further thereafter under the influence of line pressure without the danger of said diaphragm engaging sharp corners, or the like, capable of damaging same.

Inventor
Thomas F. Rost
By: Olson, Trexler, Wolters & Bushnell

Inventor
Thomas H. Rost
By: Olson, Trexler, Wolters & Bushnell
Attys

DIAPHRAGM VALVE CONSTRUCTION

BACKGROUND OF THE INVENTION

The present invention relates generally to valves, and more particularly to a type of valve wherein the flow of fluid is regulated by selectively positioning a flexible diaphragm relative to a stationary weir disposed in a through passage of the valve.

The general or overall construction of a diaphragm valve is well known in the art. Briefly, these valves normally include a valve body which has an internal through passage with a weir disposed intermediate the inlet and outlet ports thereof, and an opening in said body positioned above said weir. A flexible diaphragm is secured in position over said opening by means of a bonnet or housing arrangement, or the like, which carries a reciprocal actuator member. The actuator member is attached to the outer surface of the diaphragm, such that movement of said actuator results in corresponding movement of the diaphragm. Accordingly, upon engagement of the diaphragm with the weir, the flow of fluid through said passage is blocked.

Diaphragm or weir type valves, are capable of economic manufacture and have been accorded wide acceptance. These valves are especially well suited for use in controlling the flow of caustic and/or corrosive liquids, such as must be handled in the chemical processing field. The advantages provided by a diaphragm valve in this environment are realized from the fact that, except for the single flexible diaphragm employed, all moving or precision machined parts are completely isolated from the fluid so as to positively preclude contact therewith.

While the prior art valve constructions have enjoyed considerable commercial success, they have been subject to certain persistent weaknesses and failures. More specifically, due to the comparatively frail nature of the flexible diaphragm, its service life has proven somewhat limited, which adds considerably to the cost and effort involved in maintaining these valves during service.

Primarily, the problems or damage encountered with this type of valve result in the main from two factors, viz, overcompression and expansion of the diaphragm against the relatively sharp corners of the bonnet assembly.

Considering first the problem of overcompression, diaphragm valves are generally operated by means of a handwheel arrangement which effects reciprocal movement of the actuator to bias the diaphragm into engagement with the weir. When this occurs, it is clear that the diaphragm is now compressed between the underside of the actuator and the upper surface of the weir. In most instances, this closed condition of the valve is sensed only with relation to the resistance to continued turning of the handwheel.

Thus, an overzealous operator, in applying excessive turning moment to the handwheel, may compress the diaphragm to an extent sufficient to rupture the diaphragm. Even in those instances where the diaphragm is not ruptured, overcompression substantially reduces the life expectancy of the diaphragm and results in frequent replacement. To overcome this problem, the use of limiting arrangements employing stop members have been proposed, as shown in U.S. Pat. No. 3,250,511, issued May 10, 1966. However, as will be apparent from the preceding, structures of this type have eliminated but one source of damage to the diaphragm.

In considering the next source of damage, it must be kept in mind that the diaphragm is clamped in position between the valve body and the housing or bonnet structure. Thus, when moved to the open condition, the diaphragm must flex outwardly about a peripheral hinge that is defined by the portion thereof clamped between said body and said bonnet. When this occurs, the diaphragm is forced into contact with the edge of the bonnet, such that any sharp corners, burrs or irregularities will cut or otherwise damage the diaphragm. In addition, where relatively high fluid line pressures are encountered, there is a tendency for the diaphragm to expand outwardly to an even greater extent, which further increases the possibility of damage thereto. Further pulsating flow which occurs often in process pipelines, subjects the diaphragm to pulsing and vibrations of multiple frequencies—all of which tend to "saw" the diaphragm against sharp fins or edges that may exist on the bonnet area contacting the diaphragm.

With reference to the aforementioned U.S. Pat. No. 3,250,511 and other prior art patents teaching the employment of stop means, it should be noted that the members so employed do not overcome this problem. The existence of this problem has been recognized in the art, and it is a relatively common practice to utilize a diaphragm that has the upper surface thereof defined by a backing sheet of high tensile strength capable of resisting damage of the type mentioned. One form of diaphragm valve construction of this variety is illustrated in U.S. Pat. No. 3,148,861, issued Sept. 15, 1964. Diaphragms of this type include, not only the aforementioned backing sheet, but also internal reinforcement to provide added strength against overcompression. Quite obviously, these strengthening steps materially increase the overall cost of the valve.

SUMMARY OF THE INVENTION

The present invention overcomes many of the inherent disadvantages of prior art structures, while providing all of the advantages afforded by said structure, as well as other additional advantages not heretofore realized. More specifically, the present invention affords complete and adequate protection against damage resulting due to overcompression and/or diaphragm flexing, said protection being superior to that previously attainable. Further, these advantages and features provided by the present invention are attained in an extremely simple and economical manner which renders said invention adaptable to existing valve structures.

The above-mentioned advantages and others are realized by the employment of a diaphragm valve construction of the general type mentioned above, wherein a plate member is carried intermediate the diaphragm and the bonnet, said plate member having a central opening defined by a rigid, outwardly flared edge configuration providing at least one outwardly facing shoulder; and wherein abutment means are carried by the actuator for engagement with said shoulder to limit the degree of compression of said diaphragm between said actuator and said weir, with said flared edge configuration permitting said diaphragm to flex outwardly to the open condition and thereafter under the influence of line pressure without the danger of said diaphragm engaging sharp corners, or the like, capable of damaging same.

DESCRIPTION OF THE DRAWINGS

In addition to the above, expressly enumerated advantages and features of the present invention, others will appear from the following description of a preferred embodiment illustrated in the drawings, wherein.

DESCRIPTION OF THE ILLUSTRATED EMBODIMENT

Figure 1:
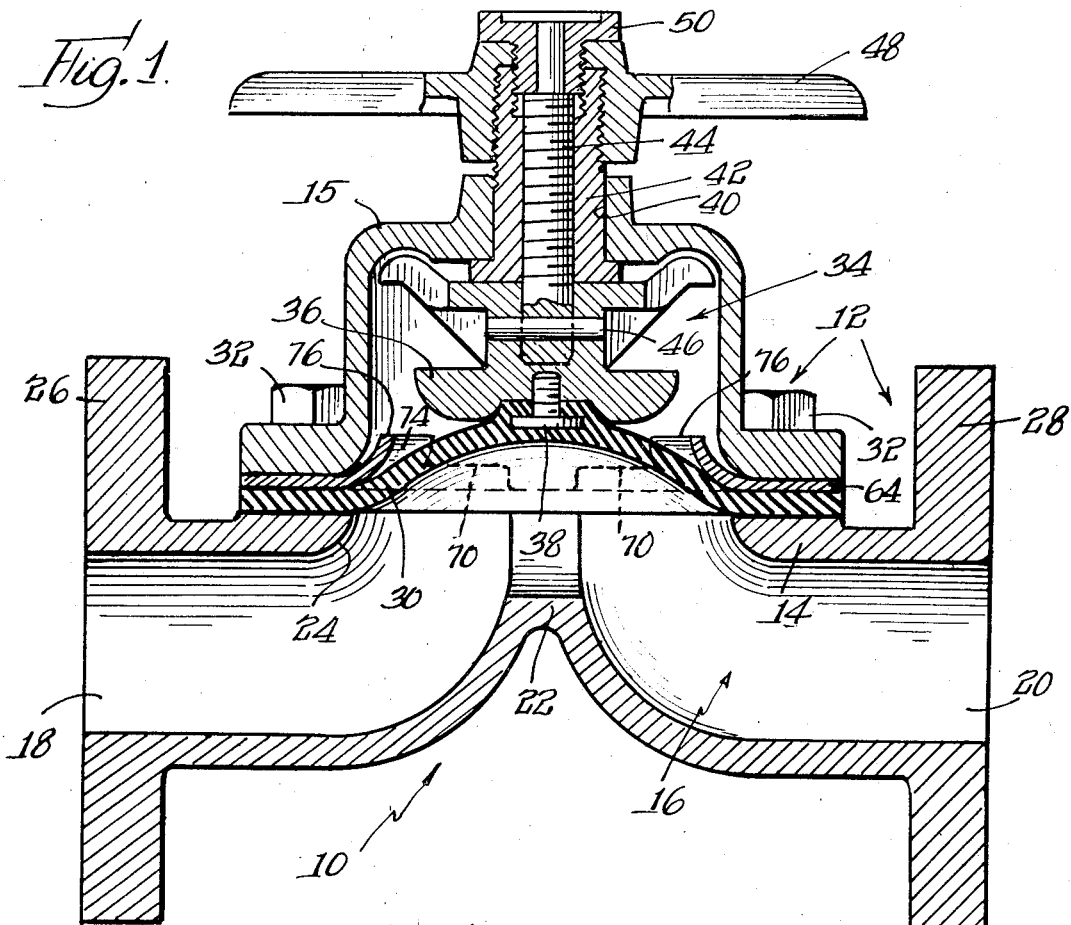
FIG. 1 is a vertical, longitudinal, sectional view of a diaphragm valve constructed in accordance with the present invention and in the open condition.
Figure 3:
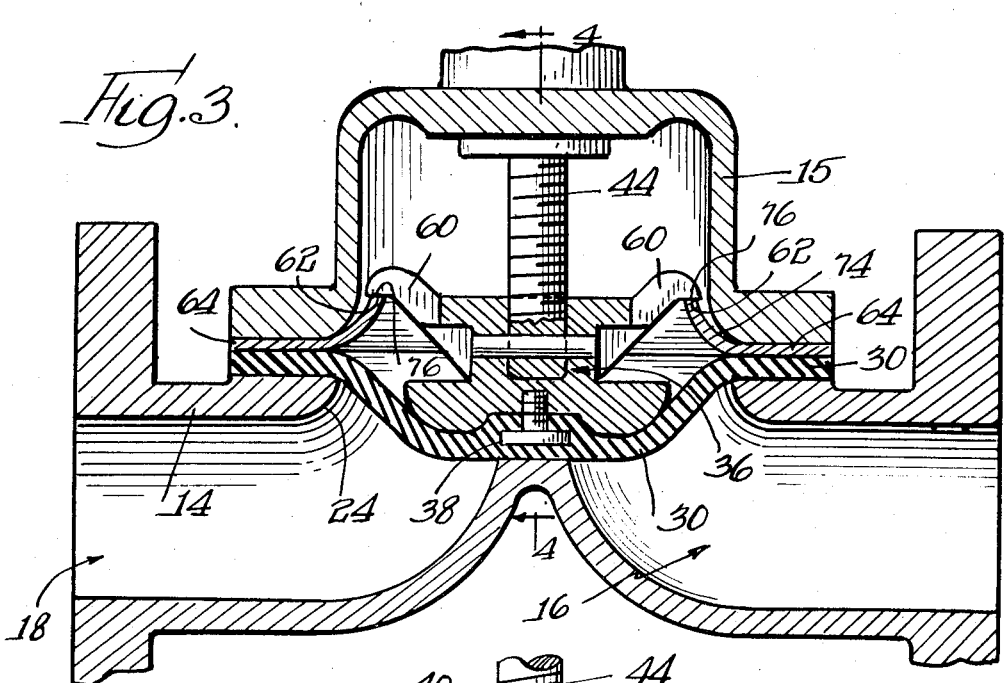
FIG. 3 is a longitudinal, partial sectional view similar to FIG. 1 and illustrating the components of the valve in the closed condition.

Referring now in detail to the drawings, and specifically to FIG. 1, a diaphragm valve construction is illustrated and designated generally 10. The disposition of the valve components as shown in FIG. 1, are such as occur when the valve is in the open condition, while the hereinafter discussed relationship of said components as shown in FIG. 3, define the closed condition for valve 10.

Valve 10 includes a valve housing assembly 12 defined by a valve body 14 and a bonnet member 15 mounted thereon. The valve body 14 has a through passage 16 which provides opposed inlet and outlet ports 18 and 20. Disposed intermediate said ports 18 and 20 within said through passage 16 is a weir formation 22 which extends transversely of said passage. An aperture or opening 24 is provided in the body 14 immediately above said weir 22. In addition, the valve body 14 also includes flanges 26 and 28 which permit the valve to be connected in a fluid line by means of bolts, clamps, or the like.

Overlying the opening 24 is a diaphragm 30 constructed from a flexible resilient material. In the illustrated embodiment, the diaphragm 30 is maintained in position by clamping between the bonnet 15 and the body 14, cap screws 32, or some other suitable fastening arrangement, being employed to secure said bonnet to the body 14.

With the bonnet 15 in position, there is provided a chamber or compartment 34 immediately above the diaphragm 30. Positioned in the chamber 34 is an actuator element 36 that is connected to diaphragm 30 by means of a threaded stud 38 molded integral with said diaphragm 30. Accordingly, upon movement of the actuator 36 toward or away from the weir 22, the relative disposition of the diaphragm with respect to said weir will be varied.

In FIG. 1, the actuator 36 is in the retracted or uppermost position which defines the open condition for the valve. Inward movement of the actuator 36 will bring the diaphragm 30 into contact with the weir 22, as illustrated in FIG. 3 to block the flow of fluid through passage 16.

The operating means for the actuator 36 may be of various known constructions. In the illustrated embodiment, however, the housing 15 has a central upper opening 40 within which is rotatably mounted an internally threaded sleeve or bushing 42. The actuator 36 includes an externally threaded stem 44 connected thereto by a pin 46, or the like, with the threaded portion thereof matingly engaged with the internally threaded sleeve 42. A handwheel 48 is secured to the rotatably mounted bushing 42 by means of a threaded connection and a retainer 50, such that said handwheel and said sleeve are connected for joint rotative movement. Accordingly, when an operator turns the handwheel 48, there is effected relative movement between the sleeve 42 and the externally threaded stem portion 44, such that said stem portion will move longitudinally of the axis of the stem thereby effecting reciprocal movement of the actuator 36. Quite obviously, this requires that the actuator 36 be mounted against rotative movement, as will be discussed hereafter with regard to FIG. 4.

Figure 4:
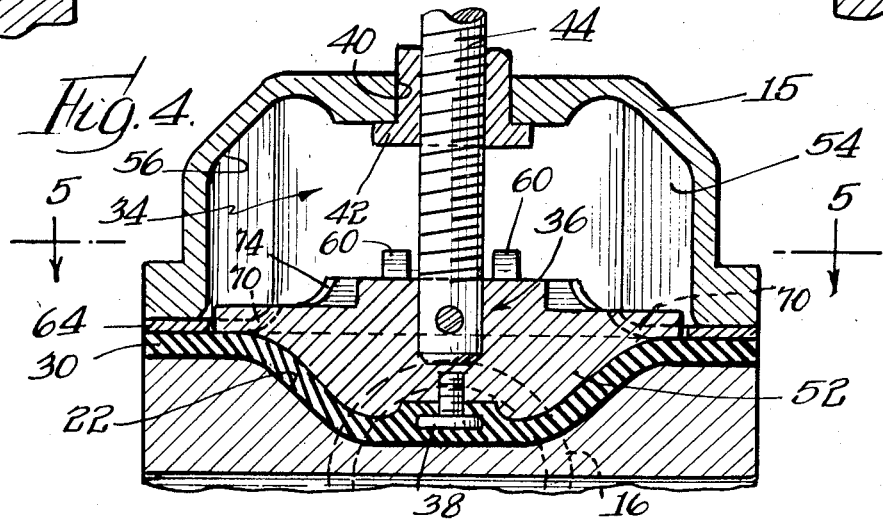
FIG. 4 is a transverse, sectional view taken along the line 4—4 of FIG. 3 in the direction indicated.
Figure 5:
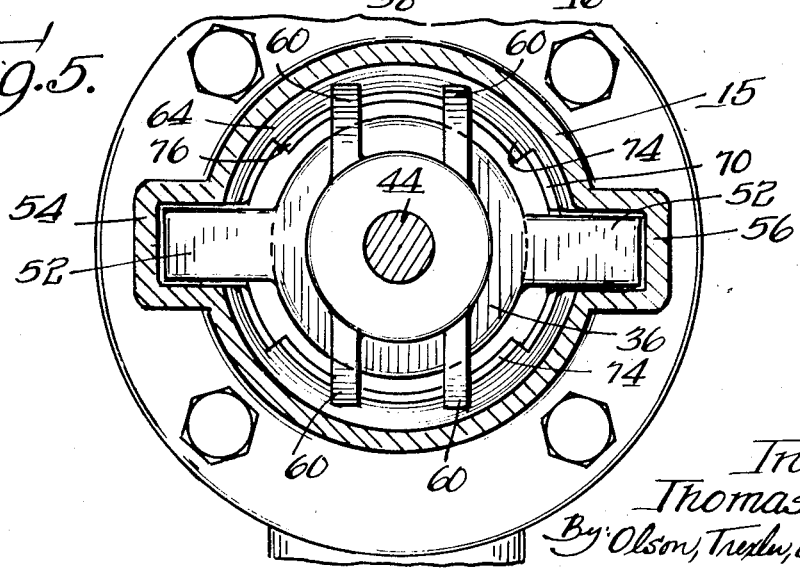
FIG. 5 is a sectional view taken along the line 5—5 of FIG. 4 in the direction indicated.

With reference to FIGS. 3-5, the closed condition of the valve 10 is illustrated. In this instance, actuator 36 is moved downwardly of the opening 24 to bring the underside of diaphragm 30 into contiguous contact with the weir 22. As can be seen from FIG. 4 the upper surface of weir 22 is of a generally arcuate configuration which is desirable to accommodate the somewhat spherical shape taken by the diaphragm when biased downwardly of opening 24.

In order to achieve complete blockage of passage 16, it is necessary that the diaphragm 30 firmly engage the upper surface of weir 22 along substantially its entire extent. This engagement is provided by the employment of diametrically opposed compression arms or extensions 52 formed integral with the actuator 36 and aligned with the weir 22. The under surface of the arms 52 are designed to compliment the shape of the upper surface of weir 22, so that not only is complete surface-to-surface engagement obtained, but the compressive forces thus exerted are distributed evenly.

The arms 52 serve an additional function from that mentioned above, in that they are operative to prevent rotation of the actuator 36. Recalling the prior discussion of the operating means, it should be noted that upon rotation of the sleeve 42, there is a tendency for the stem portion 44 and correspondingly the actuator 36 also to rotate. This rotative movement must be blocked in order to effect the desired reciprocal movement of the actuator 36, and also to prevent damage to the diaphragm 30 due to the positive interconnection of said nonrotatable diaphragm with the actuator 36. Accordingly, with this purpose in mind, the bonnet 15 is formed to provide a pair of diametrically opposed channels 54 and 56 within which the distal ends of the arms 52 are received. Thus, during reciprocal movement of the actuator 36, said arms will ride within the channels 54 and 56 with the parallel walls thereof precluding any rotation of the actuator 36 with respect to bonnet 15.

The above set forth general description of the construction and operation of the valve 10 relates to those features of said valve which are conventional. This description or discussion has been set forth to enable the reader to better understand the present invention.

Keeping in mind the aforediscussed advantages and features to be attained by the present invention, it can be seen that the conventional structure of valve 10 set forth to this point, does not in any way limit the compression of the diaphragm 30, nor does it guard against damage that may result due to expansion of flexing of the diaphragm under fluid pressure. Inviting attention initially to FIG. 2, there is illustrated the valve components which afford the desired advantages and features, and which can be used in the construction of new valves, as well as replacement parts for existing structures.

Figure 2:
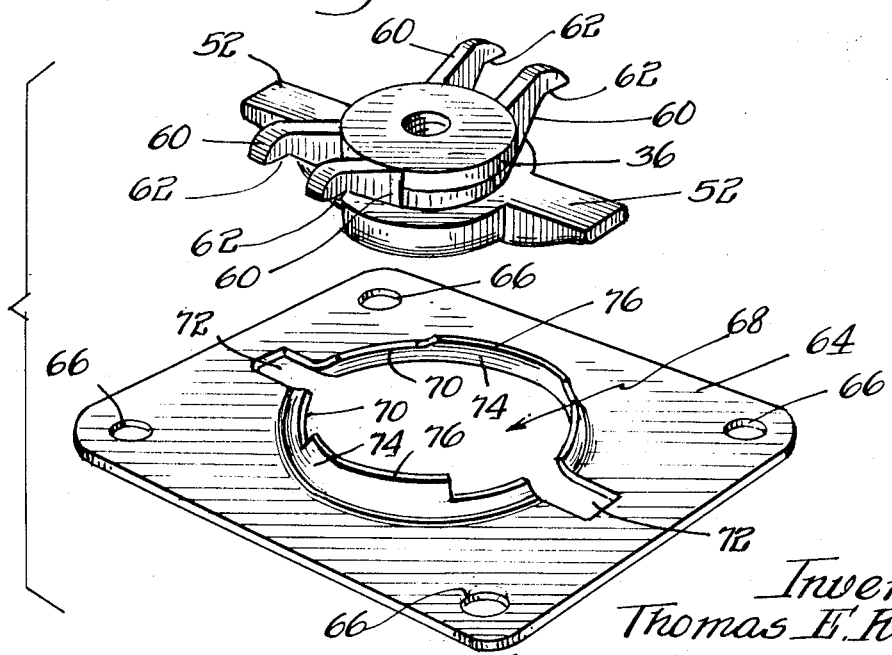
FIG. 2 is an exploded, perspective view of the novel plate member and actuator arrangement utilized in conjunction with the valve of FIG. 1.

Specifically, considering FIG. 2, a preferred construction of the actuator 36, sans stem portion 44 is illustrated. At diametrically opposed locations disposed approximately 90° from the compression arms 52, there are provided two pair of winglike members 60 extending outwardly from the main body portion of the actuator 36. Each said winglike member 60 is sized to be received within the housing 15 and terminates in a downwardly facing abutment surface or shoulder 62.

Disposed immediately below the actuator 36 in FIG. 2, which is an exploded perspective view, is a novel plate member 64 which, in conjunction with the actuator 36, achieves the desired advantages and features of the present invention. As can be seen, plate member 64 is of a substantially planar, rectangular construction, having apertures 66 formed therein adjacent the respective corners. These apertures 66 are designed to accommodate the cap screws 32 so as to position properly the plate 64 with respect to the diaphragm 30 and opening 24 when the valve is assembled.

A central aperture designated generally 68 is formed in the plate 64 which accommodates expanding of the diaphragm 30 and movement of actuator 36. The plate member 64 is substantially rigid with the peripheral edge portion 70 defined by said aperture 68 being flared upwardly. The flared edge portion 70 extends about substantially the entire periphery of opening 68, except for the diametrically opposed slots 72 which accommodate the arms 52 during operation of the valve. In addition, the relatively rigid edge portions 70 also include a pair of diametrically opposed, similarly flared, arcuate segments 74 which are in reality, continuations of the flared edge portion 70 but extend outwardly and upwardly for a greater distance. The upper edge of each segment 74 provides a shoulder 76 adapted to be engaged by the abutments 62 during operation of the valve.

Accordingly, with reference to FIGS. 1, 3 and 4, the function and operation of the actuator 36 and plate 64 of FIG. 2 will now be considered in relation to the overall construction of valve 10.

As can be seen in FIG. 1, the plate member 64 is disposed intermediate the diaphragm 30 and housing 15 in contact with the upper side or surface of said diaphragm. Accordingly, with the plate member 64 thus positioned, the diaphragm 30 is free to flex outwardly upon being moved to the open condition or uppermost position by the actuator 36, as well as upon additional flexing thereof resulting from elevated line pressures. In this regard, it can be seen that the flared configuration of the edge portions 70 and the corresponding integral segments 74 accommodate this bulging or flexing of the diaphragm 30 without presenting sharp corners, or the like, capable of damaging the diaphragm construction. However, upon compression of the diaphragm 30 in the area of slots 72, when the capscrews 32 are tightened, there is a tendency for the diaphragm material to bulge upwardly. Accordingly, if desired, backing material may be used in this area to guard against the possibility of damage, as shown in the aforementioned U.S. Pat. No. 3,148,861.

With specific reference to FIG. 3, it can be seen that the flared segment 74 of the edge portion 70 extends radially inward and upwardly of the aperture 68 to an extent wherein shoulders 76 are disposed beneath and in position for engagement with the abutment surfaces 62 on the members 60. Thus, as the handwheel 48 is turned to move the actuator 36 downwardly, said abutments 62 will be brought into contact with the shoulders 76. The sizing of the various valve components is adjusted and designed so that when this engagement of abutments 62 with shoulders 76 occurs, the diaphragm 30 will be firmly compressed between the weir 22 and the actuator 36, with only the desired degree of compressive force being exerted thereon. Due to the substantially rigid construction of the segments 74 of the edge portion 70 and the aforementioned engagement of the abutments 62 therewith, further inward travel of the actuator 36 is positively precluded so that there is substantially no danger or change that the diaphragm 30 will be overly compressed.

After some time of usage, if the diaphragm should permit leakage from unit of compressive force decay by compression set of the elastomeric diaphragm—then the whole bonnet and thrust stop mechanism can be adjusted downwardly onto the body and weir area by further tightening by controlled torque of the bonnet cap screws 32, until the leakage is stopped.

It will be observed, that by the employment of the plate member 64 and the actuator construction 36 of the present invention, that a new and novel valve is provided which assures against damage to the diaphragm occasioned by overcompression and/or excessive bulging as is encountered with conventional diaphragm valves. The specific embodiment described above and illustrated in the drawings is but a preferred construction and it is envisioned that various changes or modifications in the valve structure, beyond that described, will occur to those skilled in the art. For example, modifications in the construction of the elements which provide the opposed abutments 62 may be made, as well as changes in the exact configuration of the rigid, flared edge portions 70. Concerning this latter point, the general dimensions of the flared edge portions 70 may be such that they are sufficient to serve the compression limiting function without employment of the extension segments or segments 74. Also, the slots 72 for accommodating the arms 52 may be eliminated by adjusting the overall construction, such that said arms will pass freely within the apertures 68 defined by a circumferentially continuous flared edge portion. Regardless of the changes, modifications and alterations that may be made, these are to be understood and considered as forming a part of the present invention insofar as they fall within the spirit and scope of the claims appended hereto.

The invention is claimed as follows:

1. A valve comprising in combination: a valve body having an internal through passage with a weir disposed intermediate the ends thereof, said valve body having an opening positioned above said weir; a bonnet affixed to said body in surrounding relation to said opening; a valve actuator carried by said bonnet and reciprocal inwardly toward and outwardly away from said weir; a flexible diaphragm overlying said opening, the upper surface of said diaphragm being connected to said actuator for movement therewith, such that the underside of said diaphragm may be moved inwardly into engagement with said weir in blocking relation to said passage to define a valve closed condition, or moved outwardly away from said weir to define a valve open condition upon reciprocal movement of said actuator; and a plate member disposed intermediate said diaphragm and said bonnet in engagement with the upper surface of said diaphragm, said plate member including an outwardly flared portion terminating with an outwardly facing peripheral edge, said flared portion defining a centrally disposed aperture for permitting outward flexing of said diaphragm, said peripheral edge of said flared portion defining a shoulder along at least a portion thereof; abutment means carried by said actuator for engagement with said shoulder to limit inward movement of said actuator to prevent overcompression of said diaphragm against said weir, said flared portion permitting said diaphragm to flex outwardly upon movement to the open condition, and thereafter under the influence of line pressure, without presenting to said diaphragm, a sharp edge capable of damaging the same.

2. A valve as defined in claim 1, wherein said actuator includes diametrically opposed compression arms formed integral therewith, said compression arms being substantially coextensive with said weir, the under surface of said actuator disposed above said weir substantially complementing the upper surface of said weir to effect engagement of said diaphragm along substantially the entire extent of said weir.

3. A valve as defined in claim 2, wherein said bonnet further includes a pair of diametrically opposed channels, the distal ends of said arms being disposed within said channels.

4. A valve as defined in claim 3, wherein said bonnet provides a substantially closed housing structure except for a central opening in the upper portion thereof within which is rotatably mounted an internally threaded sleeve; said actuator having an externally threaded stem matingly engaged with said rotatable sleeve; and operating means connected with said sleeve for effecting rotation thereof which is operable to produce said movement of the actuator.

* * * * *